United States Patent [19]

Cartmell

[11] Patent Number: 5,137,103
[45] Date of Patent: Aug. 11, 1992

[54] REMOTE CONTROLLED GOLF BAG CART

[76] Inventor: James R. Cartmell, 11 Chipman Heights, Middlebury, Vt. 05753-1201

[21] Appl. No.: 707,507

[22] Filed: May 30, 1991

[51] Int. Cl.⁵ .............................. B60T 7/16; B62D 1/00
[52] U.S. Cl. ..................................... 180/167; 180/215; 180/13; 280/DIG. 5
[58] Field of Search ................... 280/DIG. 5, DIG. 6; 180/13, 19.2, 167, 215, 168, 332

[56] References Cited

U.S. PATENT DOCUMENTS

| | | | |
|---|---|---|---|
| 3,472,333 | 10/1969 | Loewenstern | 180/167 |
| 3,720,281 | 3/1973 | Frownfelter | 180/6.5 |
| 3,731,756 | 5/1973 | Hajec | 180/6.5 |
| 3,742,507 | 6/1973 | Pirre | 180/79.1 X |
| 3,812,929 | 5/1974 | Farqué180 | 6.5 X/ |
| 3,815,699 | 6/1974 | Ganskopp et al. | 280/DIG. 5 |
| 3,856,104 | 12/1974 | Ohba | 180/6.5 X |
| 4,106,583 | 8/1978 | Nemeth | 180/6.5 |
| 4,109,186 | 8/1978 | Farqué180 | 6.5 X/ |
| 4,356,875 | 11/1982 | Clune | 280/DIG. 5 |
| 4,762,193 | 8/1988 | Levine | 280/DIG. 5 |
| 4,816,998 | 3/1989 | Ahlbom | 180/167 |
| 4,844,493 | 7/1989 | Kramer | 180/169 |

FOREIGN PATENT DOCUMENTS 2221661 2/1990 United Kingdom ......... 280/DIG. 5

*Primary Examiner*—Charles A. Marmor
*Assistant Examiner*—Paul Dickson
*Attorney, Agent, or Firm*—Lowe, Price, LeBlanc & Becker

[57] ABSTRACT

A remote controlled golf bag cart is described. The cart consists of two rear wheels and a front wheel mounted on a tricycle-type chassis. The rear wheels are coupled to a battery operated electric motor which drives them simultaneously. The front wheel is controlled by a motor driven worm device which turns the front wheel to the right or the left. A remote control is used to operate the motor which typically has a rheostat and to turn the front wheel to the left or right. The remote control is a radio signal transmitter and receivers are operably coupled to the drive motor and the directional motor.

7 Claims, 7 Drawing Sheets

REMOTE CONTROLLED GOLF BAG CART

FIELD OF THE INVENTION

This invention relates to a lightweight, portable cart for carrying golf clubs which is highly maneuverable and designed to be easily controlled by the user either at a distance, or from manual controls on the cart itself.

DESCRIPTION OF THE PRIOR ART

In recent years, riding golf carts are being used more and more at golf courses. At some courses, such carts are an important revenue source. However, the use of a riding golf cart eliminates much of the physical exercise normally associated with playing the game of golf.

Manually operated tricycle-type golf bag carts have also been in use for many years. Such carts facilitate play without a caddy and normally are collapsible so that they can easily be fit into a car trunk. Such tricycle-type carts have also been motorized as, for example, in U.S. Pat. No. 4,106,583. In that patent, a separate battery-operated motor is provided on each of the back wheels and the front wheel is permitted to rotate freely. The control is on a hand grip and is a motorcycle-type continuously variable throttle. The rear wheels are equipped with clutches which permit the wheels to travel at different speeds when negotiating turns. The operator, however, continues to guide the cart by hand so that the motors are primarily a power assist to manual operation.

Remotely controlled golf bag carts are also known. For example, in U.S. Pat. No. 4,844,493, the cart is provided with infrared signal detecting devices and the infrared signal is generated by a transmitter carried on the player's person. The cart then is adapted to follow the player. The electronics, however, are quite complicated. While the device is essentially a tricycle chassis, the rear wheels are separately controlled and powered. Turning movements are achieved by the rear wheels. The device also, in addition to sensing the direction of the transmitted signal, senses the proximity. The power supply then is controlled based on the proximity to the signal. Speed is decreased as the device approaches the signal until the power supply is finally shut off when it reaches the signal.

U.S. Pat. No. 3,742,507 also is directed to an automatic golf bag cart wherein the cart follows a transmitter carried by the player and in which a speed control is provided whereby as the cart approaches the player, it slows down and finally stops. This patent also involves very complex circuitry, but uses a radio signal rather than infrared.

U.S. Pat. No. 3,720,281 also describes a radio-controlled automatic golf bag cart. That patent describes very complex circuity whereby the cart follows at a predetermined distance, slows down as the transmitter approaches or speeds up as the transmitter moves away. The cart in this patent also has a reverse gear. However, the transmitter must be turned off before the player can approach the cart as it would automatically move away from the transmitter when it approaches.

Accordingly, there is a need to provide a remote-controlled golf bag cart which is relatively simple and compact and, therefore, reliable and easy to use.

SUMMARY OF THE INVENTION

It has been discovered that a highly efficient and compact golf bag cart can be provided which will function quite adequately without being fully automatic. While the device of this invention is remote controlled, preferably by a radio signal, the complex circuitry necessary for fully automatic operation has been eliminated together with the inherent lack of efficiency through breakdowns that are associated with such complex circuitry. The device of this invention has a battery-powered motor which drives the back wheels and a motor powering the directional front wheel in a tricycle chassis. While in the preferred embodiment, manual controls are provided on a handle, the remote signal also can be used and it preferably is a device similar to that used to control, for example, model airplanes and model cars.

In the preferred embodiment, the controls would be a left or a right which signal would cause the front wheel to turn to the left or the right for a predetermined period of time and then return to the normal forward position, and an on-off control for the drive motor.

By controlling the front wheel, the device can turn on a very short radius, but more importantly, the prior art devices utilized separate motors on the rear wheels for the turning movement and a freely swiveling front wheel. The device of this invention, however, uses only a single motor to drive the rear wheels and a conventional worm gear driven by a small motor for turning movements on the front wheel. Since the power for movement of the cart is provided by the rear wheels, the motor on the front wheel need only be strong enough to turn the wheel to the left or right.

Also in the preferred embodiment of this invention, the motor remains engaged at all times so that on a downward slope, the cart will not tend to run away.

Accordingly, it is an object of this invention to provide a compact and efficient remote-controlled cart for transporting golf bags and the like.

It is another object of this invention to provide a remote-controlled golf bag cart in which a tricycle chassis is provided with driven rear wheels and a controlled front wheel for turning movements.

It is another object of this invention to provide a relatively uncomplicated and reliable golf bag cart which may be either controlled by remote or manually by controls on the handle thereof whereby the player can control the direction and speed of the cart. These and other objects will become readily apparent with reference to the drawings and following description wherein:

DETAILED DESCRIPTION OF THE INVENTION

Figure 1:
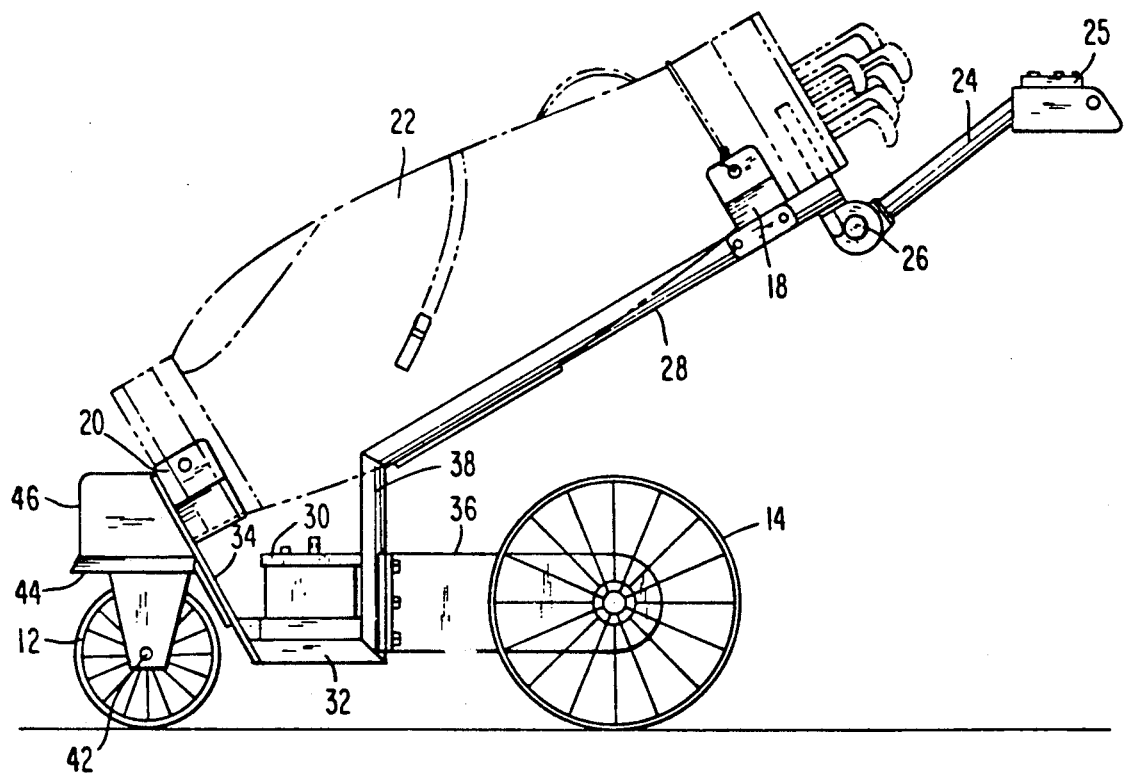
FIG. 1 is a side view of an embodiment of the cart of this invention showing a golf bag in phantom.
Figure 2:
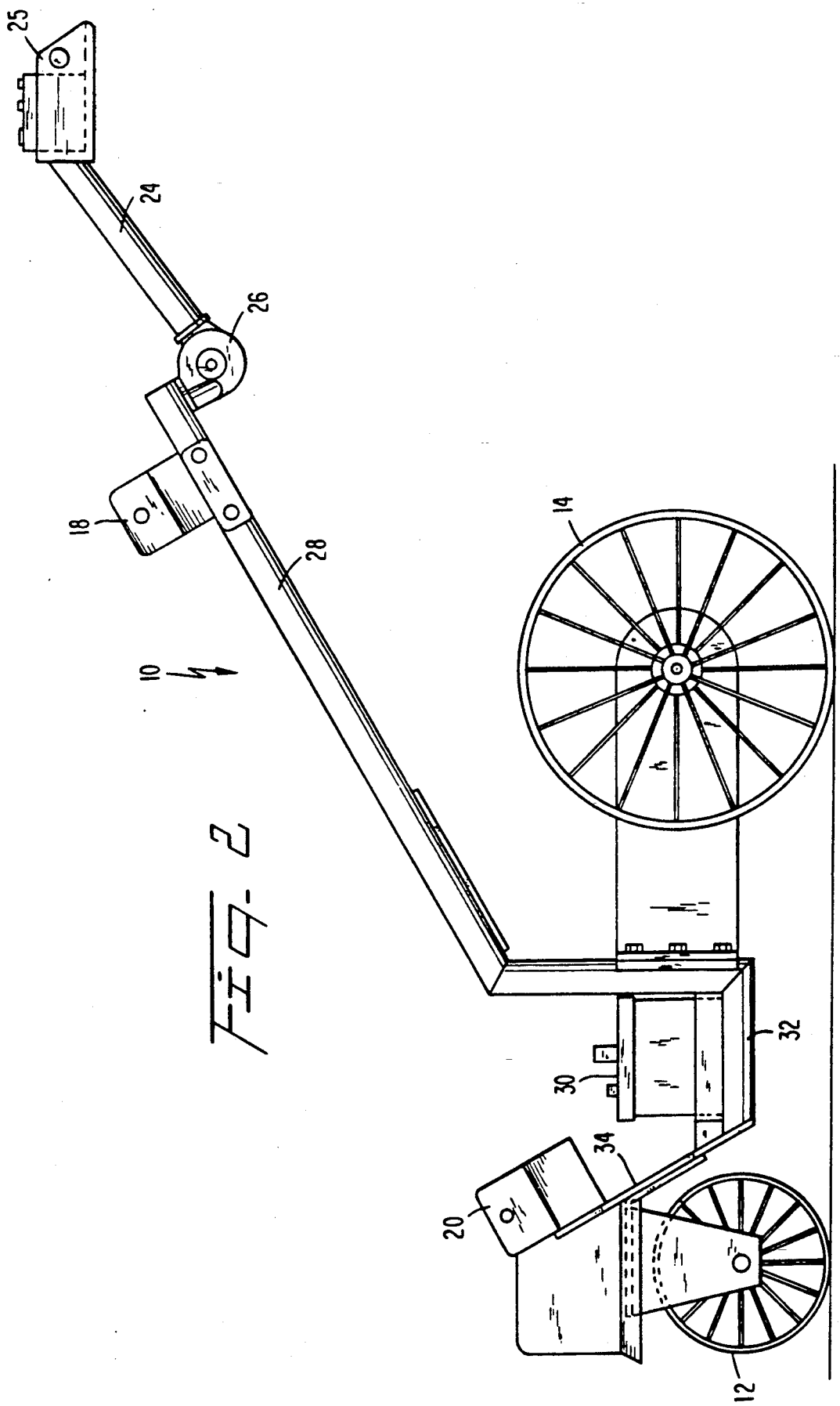
FIG. 2 is a side view similar to FIG. 1 without the golf bag.

As indicated above, this invention is intended to provide a lightweight, efficient and dependable remote-controlled golf bag cart. Essentially, elimination of the automatic features shown in the prior art whereby the golf cart automatically follows a transmitter has eliminated complex circuitry which was both expensive and subject to breakdown.

Accordingly, the component parts, as will be described, are conventional. The electronic controls are conventional and similar to the radio controls used with model airplanes. Such controls are available, for example, through Progress Instruments of Lees Summit, Missouri. While the controls shown herein are push button, it will be obvious to those skilled in the art that a joy stick could be used also.

The cart of this invention 10 utilizes essentially a tricycle chassis having a single front wheel 12 and a pair of back wheels 14 and 16. Upper and lower golf bag supports 18 and 20 are provided. While a single golf bag 22 is shown, it will be obvious to those skilled in the art that supports 18 and 20 could be modified to carry two golf bags.

A handle 24 is provided which mounts a manual control box 25. Handle 24 is preferably attached via a swivel connection 26 to inclined axial support 28 which mounts upper golf bag holder 18. A battery 30 is provided in a battery box support 32 which provides a forward wall 34 for mounting the lower bag carrier 20. A housing 36 is bolted to the rear wall 38 of holder 32. Housing 36 houses a conventional electric motor and, preferably, a rheostat together with an antenna sensor (not shown) for receiving signals from the controls. The motor in housing 36 then engages rear axle 40 and thereby drives wheels 14 and 16.

Front wheel 12 freely swivels about axle 42 which in turn is mounted on a yoke support 44. Support 44 then is rotatable relative to housing 46 which in turn contains another electric motor and a conventional worm drive. It should be noted that the drive is similar to the rear wheel drive shown in FIG. 5 of U.S. Pat. No. 4,106,583 which disclosure is hereby incorporated by reference.

Figure 3:
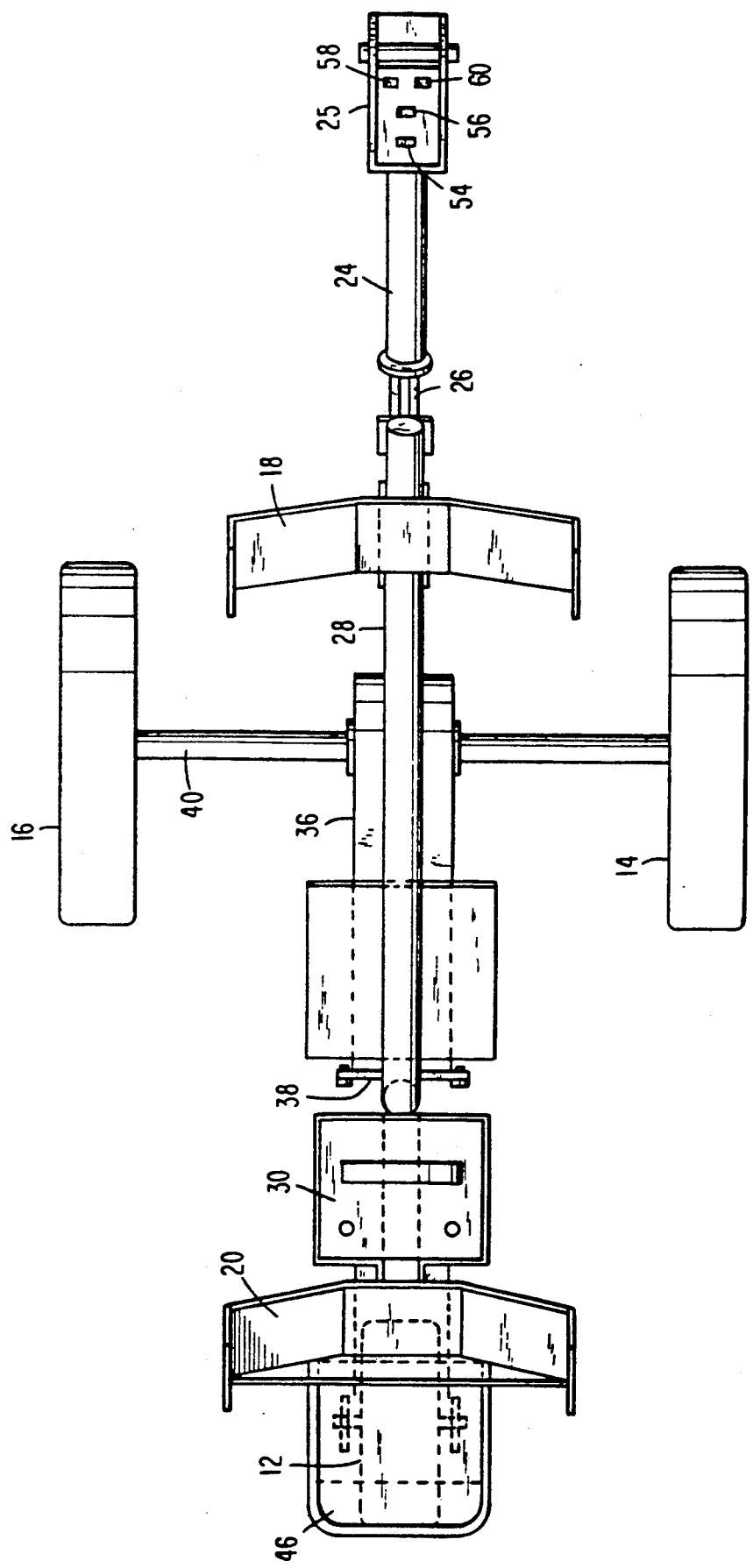
FIG. 3 is a top view of the cart of FIG. 1.
Figure 4:
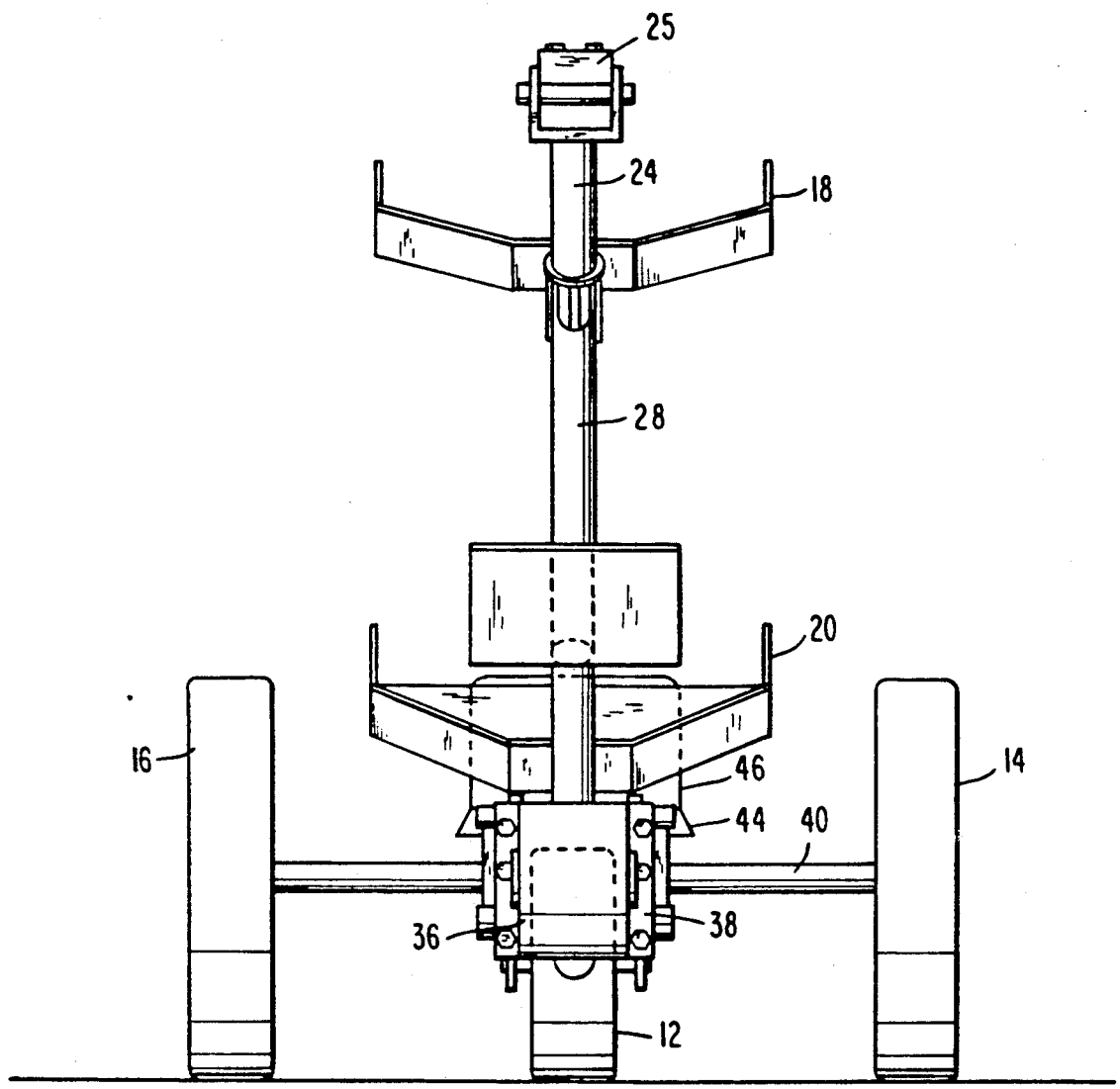
FIG. 4 is a rear view of the cart of FIG. 1.

With attention to FIG. 3, a control box 25 may have an "on" button 54 and an "off" button 56 together with a right button 58 and a left button 60. The box 25 sends signals to the drive motor 36 and the turning motor 46.

For example, when the right button 58 is depressed, the worm mechanism (not shown) will rotate the front wheel 12 to the right for a predetermined period of time and then center the wheel for forward movement.

When the on button 54 is pressed, the signal will be sent to the motor 37 to begin forward movement. Depression of the off button 56 then will send a signal which will terminate the flow of energy to the motor 37.

A separate remote control box similar to box 25 will be provided. Although this remote control box is not shown, it is identical in its controls to box 25 which is mounted on the handle extension 24. Similarly, box 25 could be removable as it is battery operated and self contained.

Figure 5:
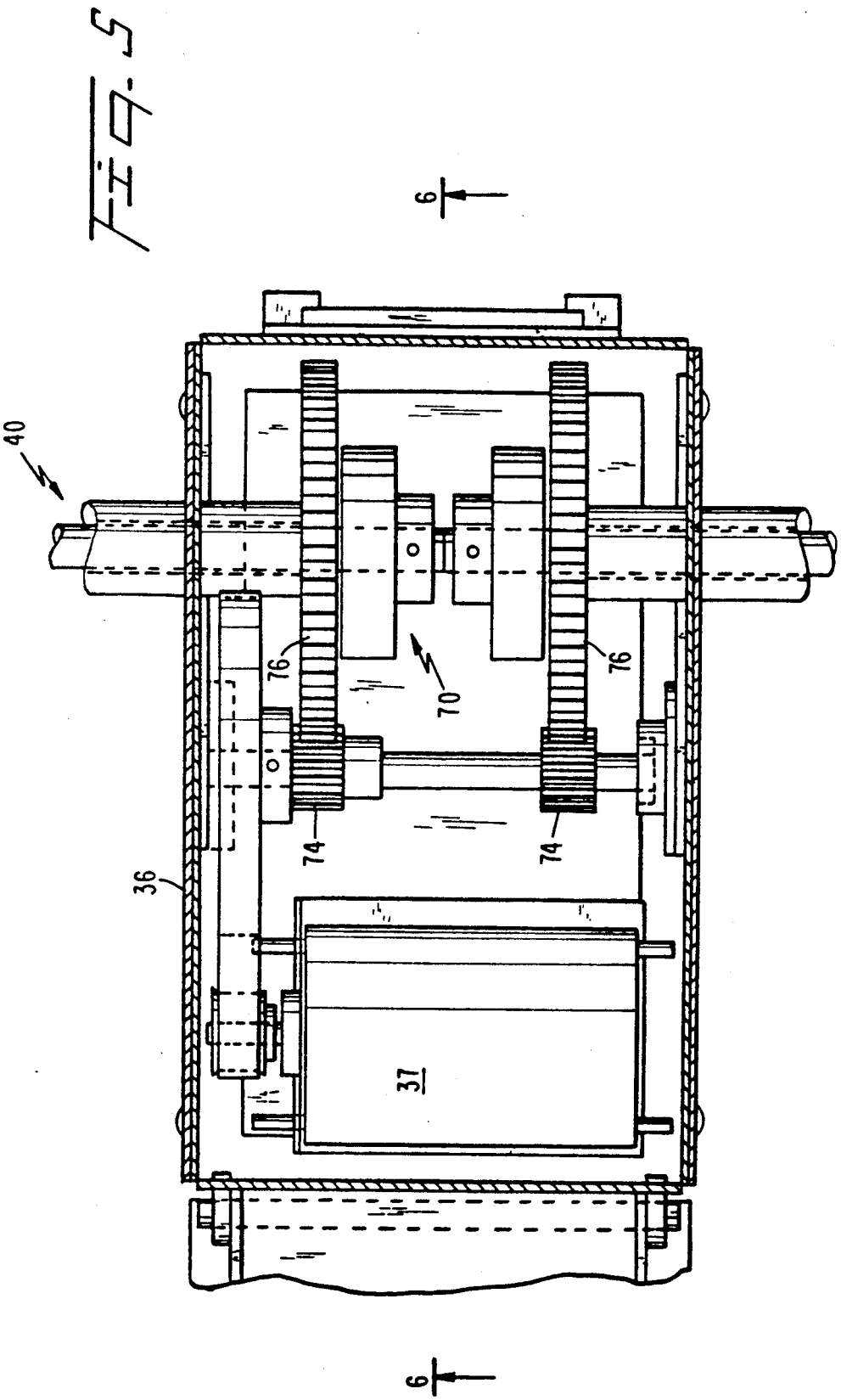
FIG. 5 is a fragmentary top view in partial section of the drive system for the cart of this invention.
Figure 6:
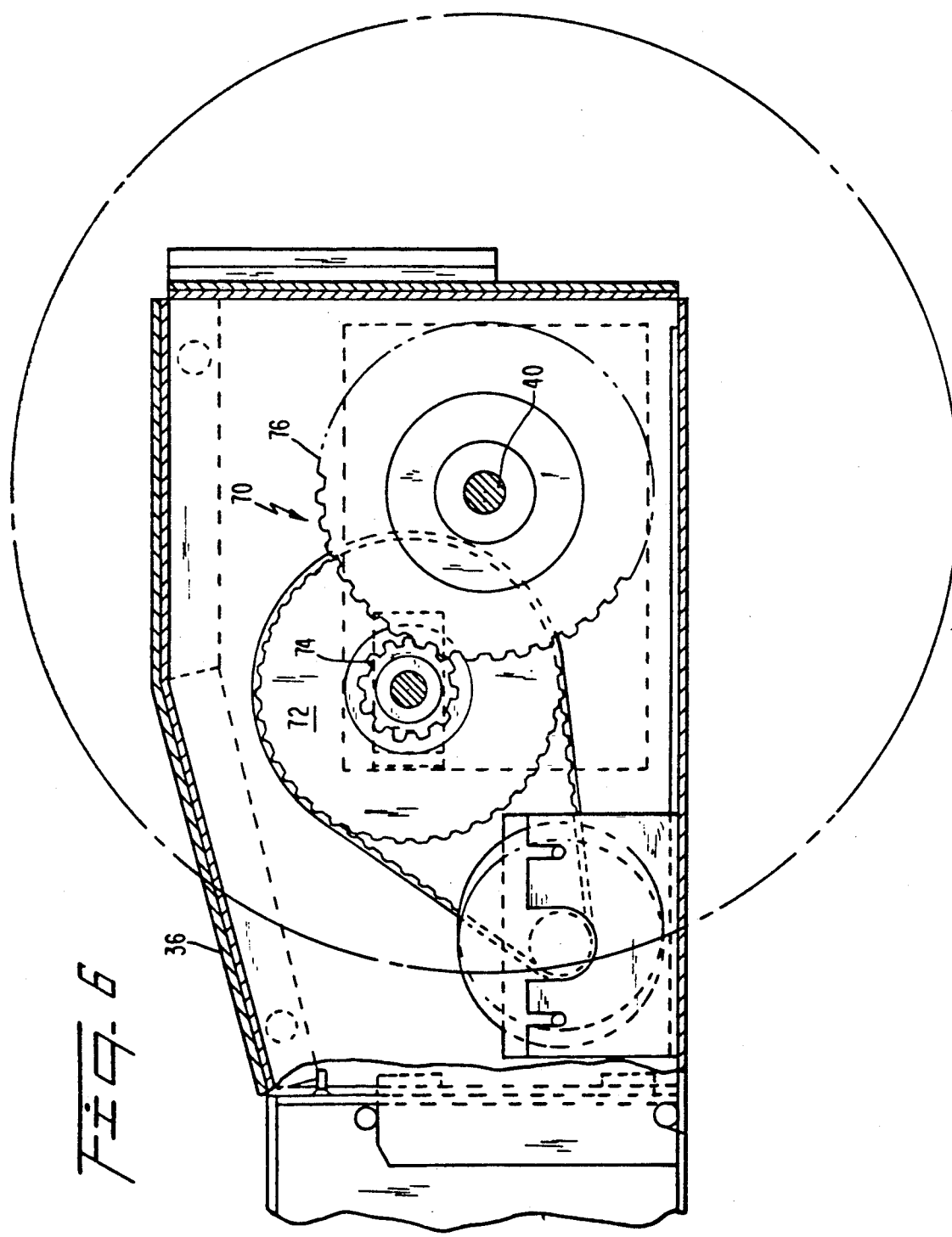
FIG. 6 is a cross-sectional view taken along lines 6—6 of FIG. 5.

With attention to FIGS. 5 and 6, the electric motor 37 which drives the rear wheels 14 and 16 is, as noted above, coupled to the axle 40. The motor is conventional design and may use any well known coupling coupling the motor output to the axle 40. As noted above, it is preferred to use a rheostat so that the speed of the motor can be controlled. The top speed, however, should be that of a brisk walk.

With reference to FIGS. 5 and 6, in the preferred embodiment of this invention, the motor 37 is coupled through a differential 70 to rear axle 40. In this way, the wheels 14 and 16 may travel at different speeds when the cart is turning in the well-known fashion. Typically, the motor drives a wheel 72 which steps down to a pair of gears 74 which drive gear wheels 76 on axle 40 in the conventional fashion.

Figure 7:
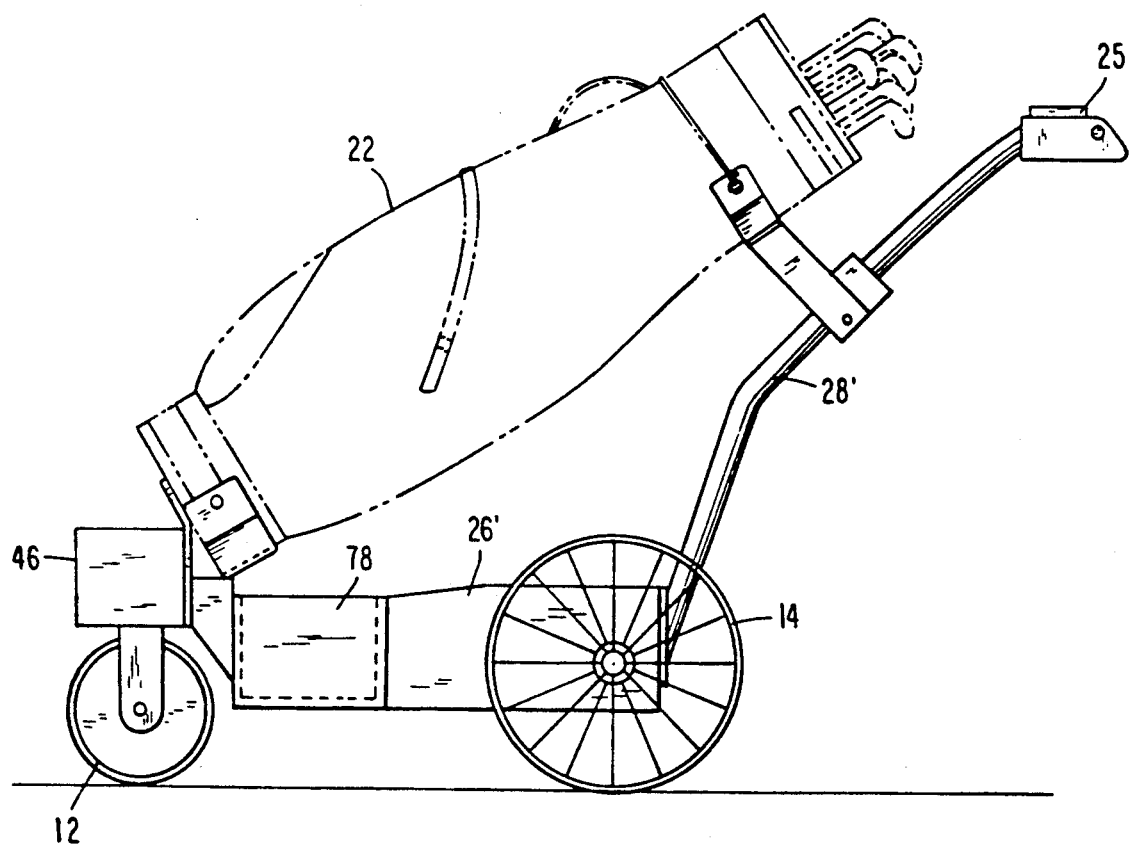
FIG. 7 is a side view of another embodiment of the cart of this invention with the golf bag shown in phantom.

With reference to FIG. 7, there is depicted therein a preferred embodiment of the cart of this invention wherein a fully enclosed battery box 78 is provided adjacent housing 36'. Housing 36', is a reconfiguration of housing 36 but still houses the motor 37 and differential 70 as described above. An upright supporting handle 28' is mounted to the rear of housing 36'. The remaining features are as previously outlined. It should be noted that the joint 26 connecting upright support 28 and handle 24 shown, for example, in FIG. 1 is not present in the embodiment of FIG. 7. It will be obvious to those skilled in the art that the configuration and reconfiguration of the device of this invention is intended to stabilize the cart and, therefore, the above descriptions are for the purposes of illustration and not for the purposes of limiting the invention herein disclosed.

As noted above, the controls also are conventional, and in a preferred embodiment of this invention, and the controls were operable at a distance of up to 135 yards.

As also noted above, the cart can be designed to carry one golf bag or two merely by replacing the supports 18 and 20 and more than one remote control could be used when two bags are carried.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A self-propelled golf bag cart comprising:
   an elongated, tricycle-type chassis including an opposed pair of rear wheels, means including an axle mounting each of said rear wheels, said axles rotatably mounted on said chassis, a front wheel having an axis of rotation, a depending yoke mounted on said chassis, said yoke rotatably mounting said front wheel, the axis of rotation of said front wheel being in a normally perpendicular position to a longitudinal axis of said chassis, said wheels forming a tricycle support for said chassis and golf bag carrying means mounted on said chassis;
   an inclined support extending upwardly from the rear of said chassis and behind said rear wheels, said support terminating in a handle;
   turning means coupled to said yoke for rotating said yoke to move the axis of rotation of said front wheel laterally to form a predetermined angle to the longitudinal axis of said chassis for a predetermined period of time and subsequently to return it to the normally perpendicular position;
   motor means coupled to said axle for driving said rear wheels;
   control means for selectively activating and deactivating said turning means and said motor means.

2. The cart of claim 1 wherein said control means includes at least one radio signal transmitter.

3. The cart of claim 2 wherein said transmitter is mounted on the support handle.

4. The cart of claim 2 wherein said transmitter normally is disposed at a location remote to said cart.

5. The cart of claim 1 wherein said motor means is adapted to drive said wheels at variable speeds.

6. The cart of claim 1 further comprising battery means carried by said chassis for powering said turning means and motor means.

7. The cart of claim 2 wherein two transmitters are provided.

* * * * *